(12) United States Patent
Pheiffer et al.

(10) Patent No.: US 10,901,065 B2
(45) Date of Patent: Jan. 26, 2021

(54) LOCATION DETERMINATION OF AN EMITTER USING FREQUENCY-OF-ARRIVAL (FOA) MEASURED FROM A SINGLE MOVING PLATFORM

(71) Applicant: The Boeing Company, Chicago, IL (US)

(72) Inventors: Brian K. Pheiffer, Palos Verdes Estates, CA (US); David O. Edewaard, Oakton, VA (US); Daniel S. Summers, Kent, WA (US); Neal Carlson, Redondo Beach, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/840,968

(22) Filed: Dec. 13, 2017

(65) Prior Publication Data

US 2019/0107599 A1    Apr. 11, 2019

Related U.S. Application Data

(60) Provisional application No. 62/571,155, filed on Oct. 11, 2017.

(51) Int. Cl.
*G01S 5/02* (2010.01)
*G01S 7/02* (2006.01)

(52) U.S. Cl.
CPC ............ *G01S 5/0273* (2013.01); *G01S 5/02* (2013.01); *G01S 7/021* (2013.01)

(58) Field of Classification Search
CPC . G01S 5/02; G01S 5/0273; G01S 5/10; G01S 5/12; G01S 3/02; G01S 3/14;
(Continued)

(56) References Cited

U.S. PATENT DOCUMENTS 5,045,861 A * 9/1991 Duffett-Smith ....... G01S 5/0009
342/457
5,526,001 A   6/1996 Rose et al.
(Continued)

FOREIGN PATENT DOCUMENTS

EP         2972455      1/2016
WO    WO 2017/003529    1/2017
WO    WO 2018/151763    8/2018

OTHER PUBLICATIONS

Witzgall, Hanna, "A Reliable Doppler-Based Solution for Single Sensor Geolocation," Aerospace Conference, Mar. 2-9, 2013, pp. 1-7, IEEE, Piscataway, New Jersey/USA.
(Continued)

*Primary Examiner* — George Eng
*Assistant Examiner* — Hung K Du
(74) *Attorney, Agent, or Firm* — Haynes and Boone LLP

(57) ABSTRACT

Systems, methods, and apparatus for location determination of an emitter using frequency-of-arrival (FOA) measured from a single moving platform are disclosed. In one or more embodiments, a disclosed system allows for location determination of stationary, pulsed radio frequency (RF) emitters from a moving platform by using coherent frequency of arrival (CFOA) Doppler history measurements. The term "coherent" is used to indicate that the process requires a RF-coherent pulse train, such as that generated by modern radar. In one or more embodiments, the disclosed system employs one of two disclosed CFOA measurement methods (Method 1: CFOA linear regression of phase (LRP), and Method 2: CFOA cross-correlated frequency spectra (CCFS)). The disclosed system also enables geo-discrimination (GeoD) of emitters at known locations, or alternatively geo-location of emitters at unknown locations.

21 Claims, 13 Drawing Sheets

(58) Field of Classification Search
CPC . G01S 3/50; G01S 3/52; G01S 13/003; G01S 7/021; G01S 13/46; G01S 13/726
See application file for complete search history.

(56) References Cited

U.S. PATENT DOCUMENTS

| | | | |
|---|---|---|---|
| 5,717,406 A * | 2/1998 | Sanderford | G01S 1/022 342/363 |
| 5,973,643 A * | 10/1999 | Hawkes | G01S 1/045 342/457 |
| 6,185,486 B1 | 2/2001 | Labounsky et al. | |
| 8,866,672 B2 | 10/2014 | Stroud | |
| 9,007,262 B1 * | 4/2015 | Witzgall | G01S 5/10 342/357.78 |
| 9,128,173 B1 | 9/2015 | Witzgall | |
| 9,562,961 B1 * | 2/2017 | Baker | G01S 3/14 |
| 9,709,662 B2 | 7/2017 | Baker et al. | |
| 2009/0224957 A1 | 9/2009 | Chung et al. | |
| 2014/0140227 A1 * | 5/2014 | Gao | G01S 5/0263 370/252 |
| 2017/0030996 A1 | 2/2017 | Fireaizen et al. | |
| 2017/0208495 A1 | 7/2017 | Kleinbeck et al. | |
| 2017/0366223 A1 * | 12/2017 | Stofer | G01S 7/021 |
| 2018/0011162 A1 * | 1/2018 | Bovard | G01S 5/0231 |

OTHER PUBLICATIONS

Lee et al., "Doppler Frequency Geolocation of Uncooperative Radars," Military Communications Conference, Oct. 29-31, 2007, pp. 1-6, IEEE, Piscataway, New Jersey/USA.

Witzgall et al., "Single Platform Passive Doppler Geolocation with Unknown Emitter Frequency," Aerospace Conference, Mar. 6-13, 2010, pp. 1-8, IEEE, Piscataway, New Jersey/USA.

Witzgall et al., "Doppler Geolocation with Drifting Carrier," Military Communications Conference, Nov. 7-10, 2011, pp. 1-6, IEEE, Piscataway, New Jersey/USA.

Karlsson, Alexander, "Feasibility Study for Single Platform Airborne FDOA and TDOA Estimation with Unknown Source", Jan. 1, 2016, XPo55599003, Retrieved from Internet: <URL: http://www.diva-portal.org/smash/get/diva2:968154/FULLTEXT01.PDF>.

Nelson D J ED et al., "Locating Emitters Using a Cross-Spectral Cross-Ambiguity Function (CSCAF)", Automatic Target Recognition XXII, PIE, 1000 20$^{th}$ St. Bellingham WA 98225-6705 USA, vol. 8391, No. 1, May 11, 2012, pp. 1-8, XP060002546, DOI: 10/1117/12.919603.

* cited by examiner

LOCATION DETERMINATION OF AN EMITTER USING FREQUENCY-OF-ARRIVAL (FOA) MEASURED FROM A SINGLE MOVING PLATFORM

CROSS-REFERENCE TO RELATED APPLICATION

This application claims the benefit of, and priority to, U.S. Provisional Application No. 62/571,155, filed Oct. 11, 2017, the contents of which are incorporated by reference herein in their entirety.

FIELD

The present disclosure relates to location determination of an emitter. In particular, it relates to location determination of an emitter using frequency-of-arrival (FOA) measured from a single moving platform.

BACKGROUND

The precise measurement of frequency is a necessary component of the location process. This is difficult with emitters that emit pulsed signals because individual pulses are usually not long enough to allow for frequency measurement with accuracy sufficient to support the determination of an emitter location. As such, there is a need for an improved technique for location determination of an emitter.

SUMMARY

The present disclosure relates to a method, system, and apparatus for location determination of an emitter using frequency-of-arrival (FOA) measured from a single moving platform. In one or more embodiments, a disclosed system allows for location determination of stationary, pulsed radio frequency (RF) emitters from a moving platform by using coherent frequency of arrival (CFOA) Doppler history measurements. The term "coherent" is used herein to indicate that the process requires a RF-coherent pulse train, such as that generated by modern radar. In one or more embodiments, the disclosed system employs one of two disclosed CFOA measurement methods (Method 1: CFOA linear regression of phase (LRP), and Method 2: CFOA cross-correlated frequency spectra (CCFS)).

In one or more embodiments, a method for location determination comprises receiving, by an antenna mounted on a moving platform, a plurality of signals transmitted from a plurality of emitters. The method further comprises identifying a signal of interest (SOI) from the signals. Also, the method comprises splitting the SOI into a plurality of look segments. In addition, the method comprises determining frequency of arrival (FOA) measurements (e.g., coherent frequency of arrival (CFOA) measurements) from the look segments. Further, the method comprises determining a location of the emitter, from the plurality of emitters, that transmitted the SOI by using the FOA measurements.

In at least one embodiment, a system for location determination comprises an antenna, mounted on a moving platform, to receive a plurality of signals transmitted from a plurality of emitters. Further, the system comprises a processor configured to identify a signal of interest (SOI) from the signals, to split the SOI into a plurality of look segments, to determine frequency of arrival (FOA) measurements (e.g., coherent frequency of arrival (CFOA) measurements) from the look segments, and to determine a location of the emitter, from the plurality of emitters, that transmitted the SOI by using the FOA measurements.

The features, functions, and advantages can be achieved independently in various embodiments of the present disclosure or may be combined in yet other embodiments.

DRAWINGS

These and other features, aspects, and advantages of the present disclosure will become better understood with regard to the following description, appended claims, and accompanying drawings where:

DESCRIPTION

Figure 1A:
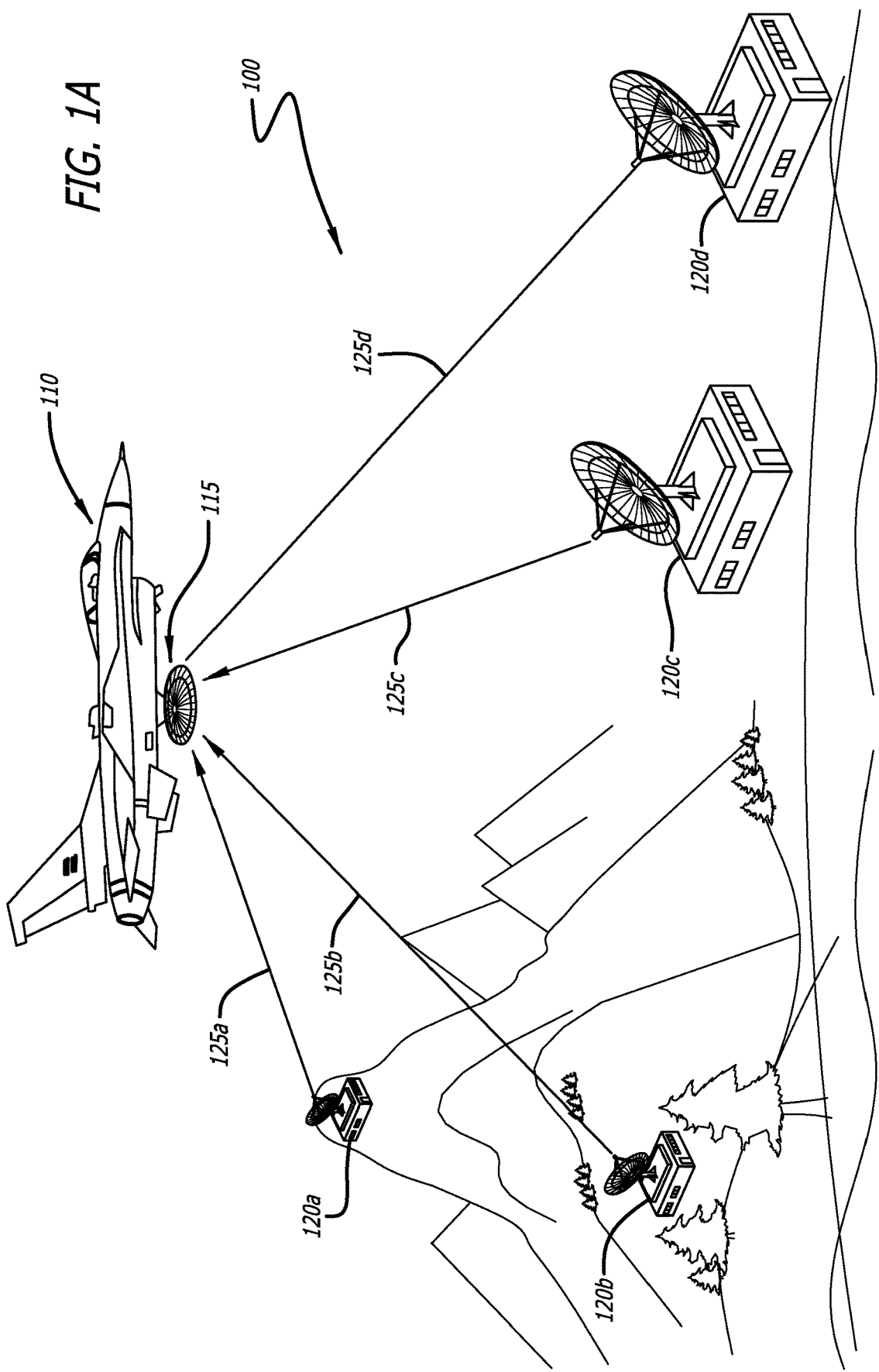
FIG. 1A is a diagram showing the disclosed system for location determination of an emitter using frequency-of-arrival (FOA) measured from a single moving platform, in accordance with at least one embodiment of the present disclosure.

The methods and apparatus disclosed herein provide an operative system for location determination of an emitter using frequency-of-arrival (FOA) measured from a single moving platform. In one or more embodiments, the system of the present disclosure allows for location determination of fixed, pulsed radio frequency (RF) emitters from a moving platform using coherent frequency of arrival (CFOA) Doppler history measurements, which enable geo-discrimination (GeoD) of emitters at known locations or alternatively geo-location of emitters at unknown locations. In at least one embodiment, the present disclosure provides for the determination of the location of the stationary emitters with reference to a moving reference frame that is provided by the moving platform. The term "coherent" is used herein to indicate that the process requires a RF-coherent pulse train, such as that generated by modern radar.

As previously mentioned above, the precise measurement of frequency is a necessary component of the location process. This is difficult with pulsed signals in that individual pulses are usually not sufficiently long enough to allow for frequency measurement with accuracy necessary to support emitter location determination. Two complementary, coherent frequency of arrival (CFOA) measurement methods that provide the required measurement accuracy are disclosed. These two CFOA methods are: (1) Method 1: CFOA linear regression of phase (LRP), which is more general and necessary for random pulse intervals, but requires demodulation of any intentional intrapulse modulation; and (2) Method 2: CFOA cross-correlated frequency spectra (CCFS), which exploits the spectral line structure of coherent pulsed signals and does not require intrapulse demodulation, but does require a consistent periodic sequence of pulse intervals.

Both of these methods can be implemented with greatly reduced processing bandwidths that need to be no greater than a small multiple of the pulse repetition frequency (PRF). The benefit is reduced signal buffer size and computational load, with little compromise to measurement accuracy.

The present disclosure also provides a geo-discrimination (GeoD) technique of distinguishing an emitter location from a set of known possible emitter locations. This GeoD method employs the statistical pattern matching of the Doppler history of a signal measured from a moving platform with the computed Doppler histories of candidate locations (i.e. locations known to emit the same signal). The method exploits the principle of Doppler shift and does not require absolute knowledge of the emitter's frequency. The Doppler history associated with an emitter at a particular radio frequency (RF) is generally unique to the emitter's location. When combined with high Doppler measurement accuracy, the disclosed method of statistical pattern matching reveals the true location of the emitter. It should be noted that although the present disclosure considers only pulsed signals for GeoD, the disclosed technique is equally applicable to continuous wave (CW) signals.

In the following description, numerous details are set forth in order to provide a more thorough description of the system. It will be apparent, however, to one skilled in the art, that the disclosed system may be practiced without these specific details. In the other instances, well known features have not been described in detail so as not to unnecessarily obscure the system.

Embodiments of the present disclosure may be described herein in terms of functional and/or logical components and various processing steps. It should be appreciated that such components may be realized by any number of hardware, software, and/or firmware components configured to perform the specified functions. For example, an embodiment of the present disclosure may employ various integrated circuit components (e.g., memory elements, digital signal processing elements, logic elements, look-up tables, or the like), which may carry out a variety of functions under the control of one or more processors, microprocessors, or other control devices. In addition, those skilled in the art will appreciate that embodiments of the present disclosure may be practiced in conjunction with other components, and that the system described herein is merely one example embodiment of the present disclosure.

For the sake of brevity, conventional techniques and components related to location determination systems, and other functional aspects of the system (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

I. Location Determination Using CFOA

FIG. 1A is a diagram 100 showing the disclosed system for location determination of an emitter using frequency-of-arrival (FOA) measured from a single moving platform, in accordance with at least one embodiment of the present disclosure. In particular, this figure shows an exemplary vehicle (i.e. an aircraft 110) that may be employed as the moving platform for the disclosed system. It should be noted that in alternative embodiments, other vehicles, than an aircraft 110 as shown in FIG. 1A, may be employed for the moving platform for the disclosed system. Other types of vehicles that may be employed for the moving platform include, but are not limited to, terrestrial vehicles (e.g., trucks or tanks), marine vehicles (e.g., ships or boats), and other types of airborne vehicles (e.g., satellites, such as low earth orbiting (LEO) satellites, medium earth orbiting (MEO) satellites, and geostationary earth orbit (GEO) satellites).

In this figure, the aircraft 110 and multiple emitters (e.g., transmitting antennas) 120*a*, 120*b*, 120*c*, 120*d* are shown. The aircraft 110 comprises a receiving antenna 115 and a receiver (refer to 140 of FIG. 1B) to receive radio frequency (RF) signals. The receive antenna 115 is mounted onto the aircraft 110, which serves as a moving platform for the receive antenna 115. The moving platform (i.e. the aircraft 110) provides a moving reference frame for the determination of the stationary emitters 120*a*, 120*b*, 120*c*, 120*d*. Various different types of antennas may be employed by the system for the antenna 115 including, but not limited to, a reflector antenna, a multifeed antenna, and a phased array antenna. In one or more embodiments, the antenna 115 may comprise one or more antennas. In at least one embodiment, the emitters 120*a*, 120*b*, 120*c*, 120*d* are stationary and are at known locations (e.g., at known locations on the ground or on stationary buildings). In other embodiments, the emitters 120*a*, 120*b*, 120*c*, 120*d* are stationary and are at unknown locations. In one or more embodiments, the system comprises at least two emitters 120*a*, 120*b*, 120*c*, 120*d*. In at least one embodiment, the system may comprise more or less emitters 120*a*, 120*b*, 120*c*, 120*d* than are shown in FIG. 1A.

In one or more embodiments, the emitters 120*a*, 120*b*, 120*c*, 120*d* are of a known type, having the same signal parameters. For example, the emitters 120*a*, 120*b*, 120*c*, 120*d* may transmit signals at very specific frequencies that allow for the identification of the specific type of transmitter that is utilized for the emitters 120a, 120b, 120c, 120d (e.g., a commercial off-the-shelf (COTS) transmitter that is known to transmit at a specific frequency).

During operation of the disclosed system, as the aircraft 110 is moving over the Earth, the receive antenna 115 on the aircraft 110 receives radio frequency (RF) signals 125a, 125b, 125c, 125d transmitted from the stationary emitters 120a, 120b, 120c, 120d. In one or more embodiments, the signals 125a, 125b, 125c, 125d are RF-coherent pulse train (i.e. comprising many pulses) signals. In alternative embodiments, the signals 125a, 125b, 125c, 125d are continuous wave (CW) signals.

The signals 125a, 125b, 125c, 125d are then received by the receiver (refer to 140 of FIG. 1B) on the aircraft 110. Processing circuitry (refer to 145 of FIG. 1B) processes the signals 125a, 125b, 125c, 125d utilizing at least one of the disclosed CFOA methods to determine the location of the emitter (i.e. 120a, 120b, 120c, or 120d) that is emitting a signal of interest (SOI) (e.g., one of the signals 125a, 125b, 125c, or 125d).

Figure 1B:
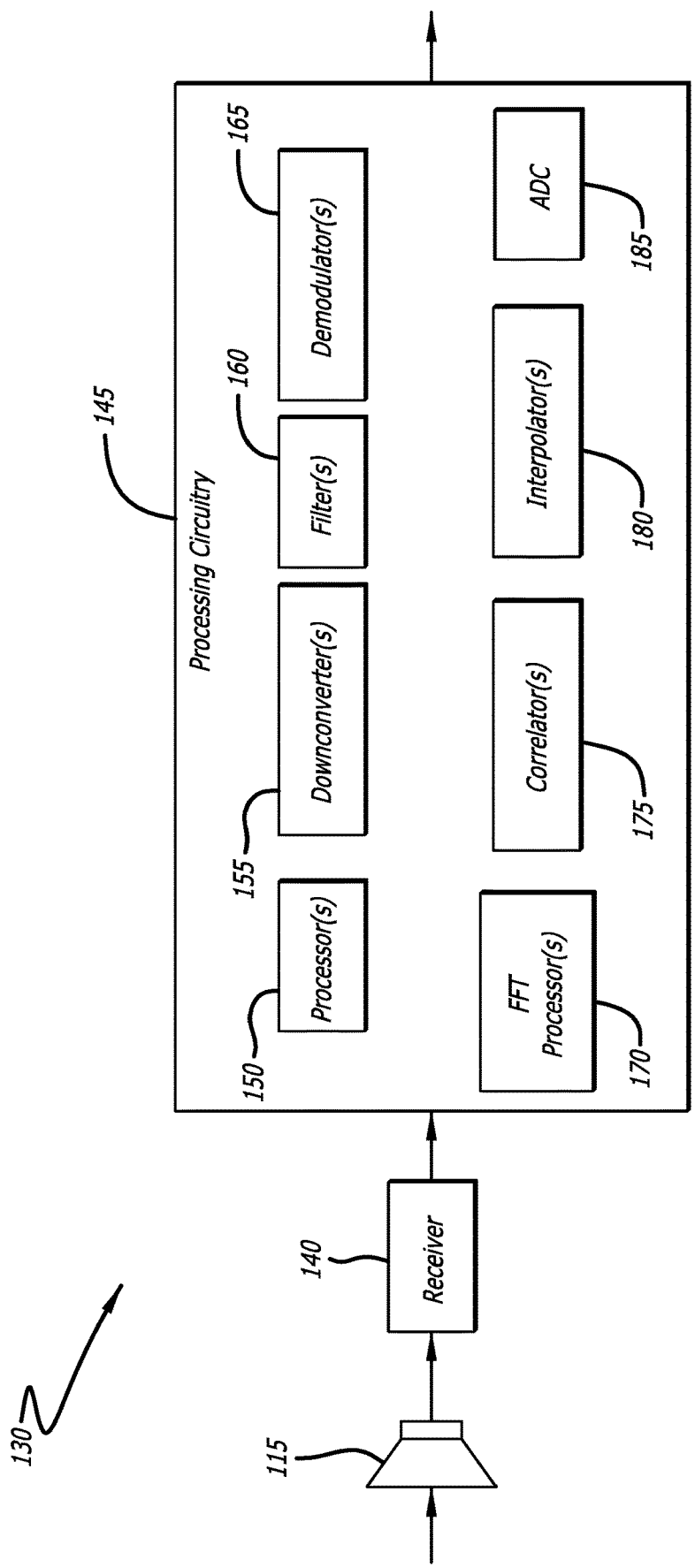
FIG. 1B is a diagram showing exemplary hardware for the disclosed system for location determination of an emitter using frequency-of-arrival (FOA) measured from a single moving platform, in accordance with at least one embodiment of the present disclosure.

FIG. 1B is a diagram 130 showing exemplary hardware for the disclosed system for location determination of an emitter using frequency-of-arrival (FOA) measured from a single moving platform, in accordance with at least one embodiment of the present disclosure. In this figure, the antenna 115, the receiver 140, and the processing circuitry 145 are shown. The processing circuitry 145 comprises various different types of units to process the signals 125a, 125b, 125c, 125d. The various different types of units that the processing circuitry 145 may comprise include, but are not limited to, at least one processor 150, at least one downconverter 155, at least one filter 160, at least one demodulator 165, at least one fast Fourier transform (FFT) processor 170, at least one correlator 175, at least one interpolator 180, and at least one analog-to-digital converter (ADC) 185. It should be noted that in some embodiments, at least one processor may simply be employed for some of the units (e.g., an interpolator 180) of the processing circuitry 145.

The processing circuitry 145 may be co-located with the receiver 140 on the aircraft 110, or may be located at a separate location, which is linked to the receiver 140 by at least one communications channel that passes at least the minimum necessary data from the signals 125a, 125b, 125c, 125d for the processing to occur. The end-to-end processing chain is illustrated in FIG. 2.

Figure 2:
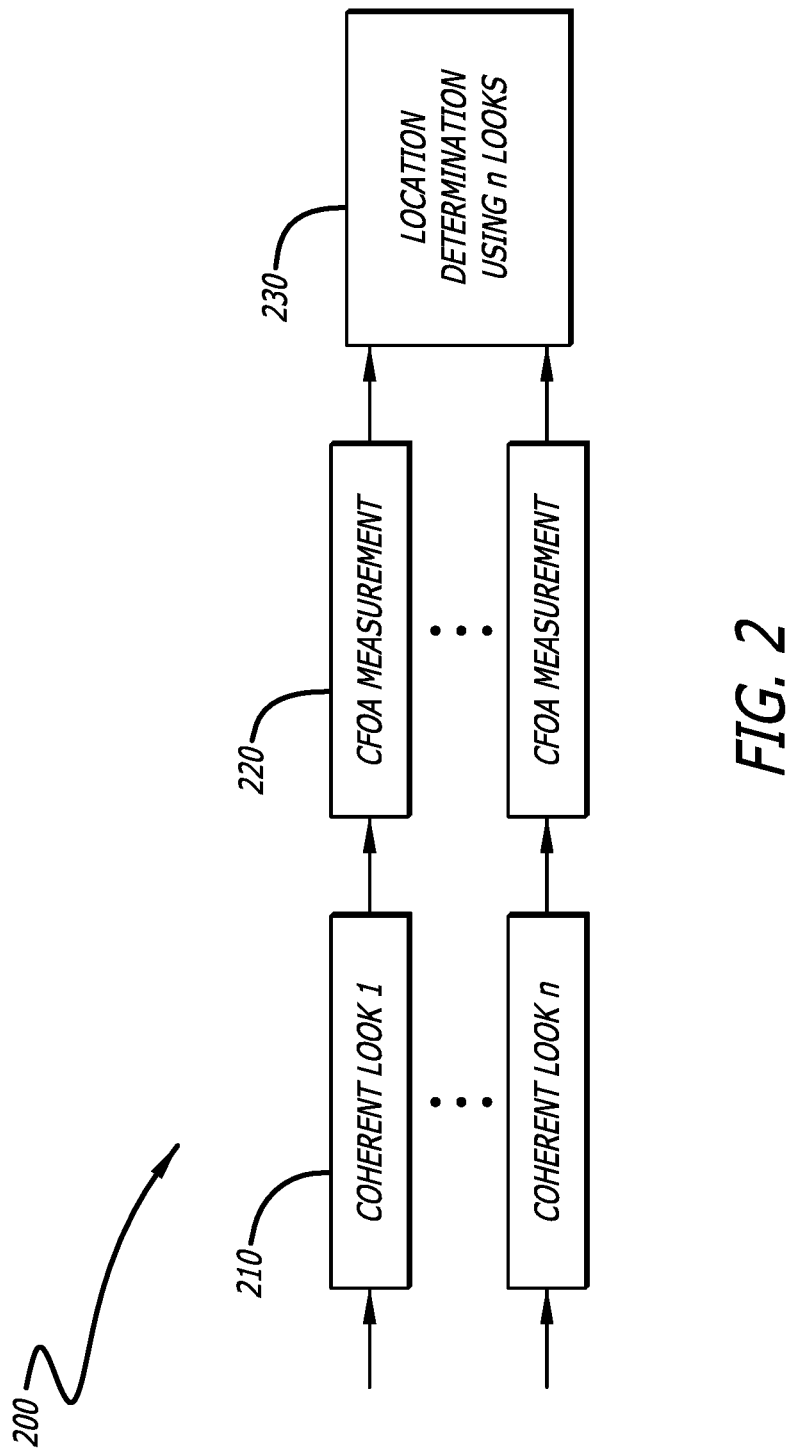
FIG. 2 is a diagram showing a high-level illustration of the disclosed location determining processing, in accordance with at least one embodiment of the present disclosure.

FIG. 2 is a diagram 200 showing a high-level illustration of the disclosed location determining processing, in accordance with at least one embodiment of the present disclosure. This figure shows the high-level process for location processing that comprises (1) coherent look generation 210, (2) Doppler CFOA measurement 220, and (3) location determination 230. In this figure, coherent look generation 210 is first performed, which comprises detecting, capturing, and isolating, by at least one processor, the signal of interest (SOI); and splitting, by at least one processor, the signal for the SOI into n number of "look" segments, where n is greater than one. Then, Doppler CFOA measurement 220 (or Doppler FOA measurement) is performed, which comprises making CFOA measurements (or FOA measurements) for each "look". Then, location determination 230 is performed, which comprises comparing the measured Doppler FOA history of a detected emitter of a known type with the computed Doppler history for known locations of the same emitter type by using a statistical discrimination process, referred to as geo-discrimination (GeoD), or alternatively geo-location of a detected emitter in an unknown location is performed. These three processes (i.e. (1) coherent look generation 210, (2) Doppler CFOA measurement 220, and (3) location determination 230) are described in more detail below.

A. Coherent Look Generation

During the coherent look generation process, the receiver receives the signals transmitted from the emitters. The receiver then transmits to the processing circuitry at least the minimum necessary data from the signals for the processing circuitry to be able to perform the processing. Then, the processing circuitry detects, parameterizes, de-interleaves (as needed), and then classifies and identifies the signals (e.g., identifies which of the signals is the signal(s) of interest (SOI)).

It should be noted that the receiver utilizes a wide bandwidth front-end, which selects (e.g., by filtering by a bandpass filter (BPF)) the appropriate passband for the signal of interest (SOI). Since frequency measurement is by nature a narrowband process, the signals need not be collected in a bandwidth greater than a small multiple of the larger of the pulse repetition frequency (PRF) and of the inverse pulse duration. This greatly reduces the amount of data that needs to be stored, transferred, and processed.

Figure 3:
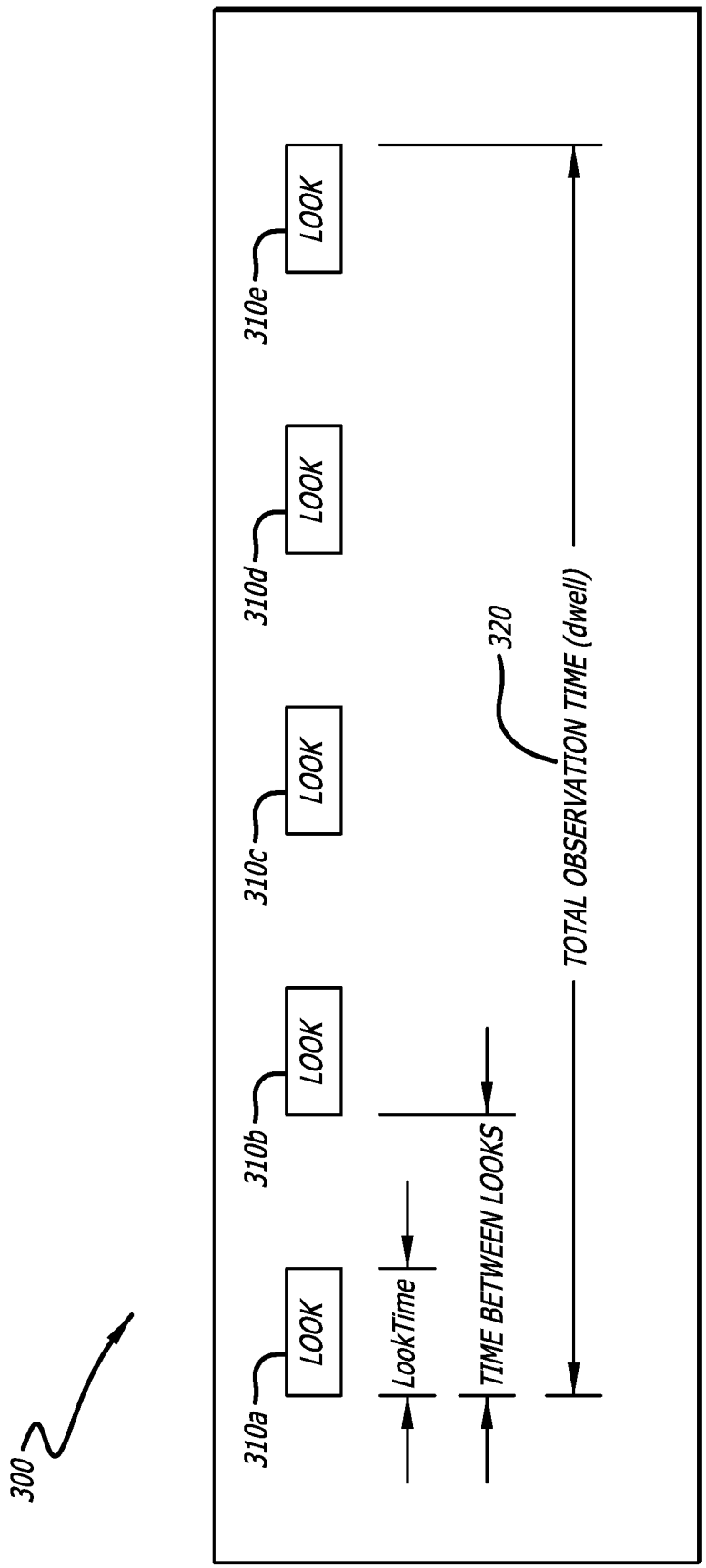
FIG. 3 is a diagram showing Doppler history comprising a number of looks (i.e. coherent frequency of arrival (CFOA) measurements), in accordance with at least one embodiment of the present disclosure.

Then, after a SOI is identified and isolated, over the total observation time (referred to as the dwell period) 320 (refer to FIG. 3) of the SOI, the SOI data is segregated, by at least one processor, into multiple, separately coherent, "looks" 310a, 310b, 310c, 310d, 310e from which the frequency of arrival (FOA) is measured and used to determine the Doppler shift as a function of time (i.e. the FOA (or Doppler) history). FIG. 3 is a diagram 300 showing Doppler history comprising a number of looks 310a, 310b, 310c, 310d, 310e (i.e. coherent frequency of arrival (CFOA) measurements), in accordance with at least one embodiment of the present disclosure.

Figure 4:
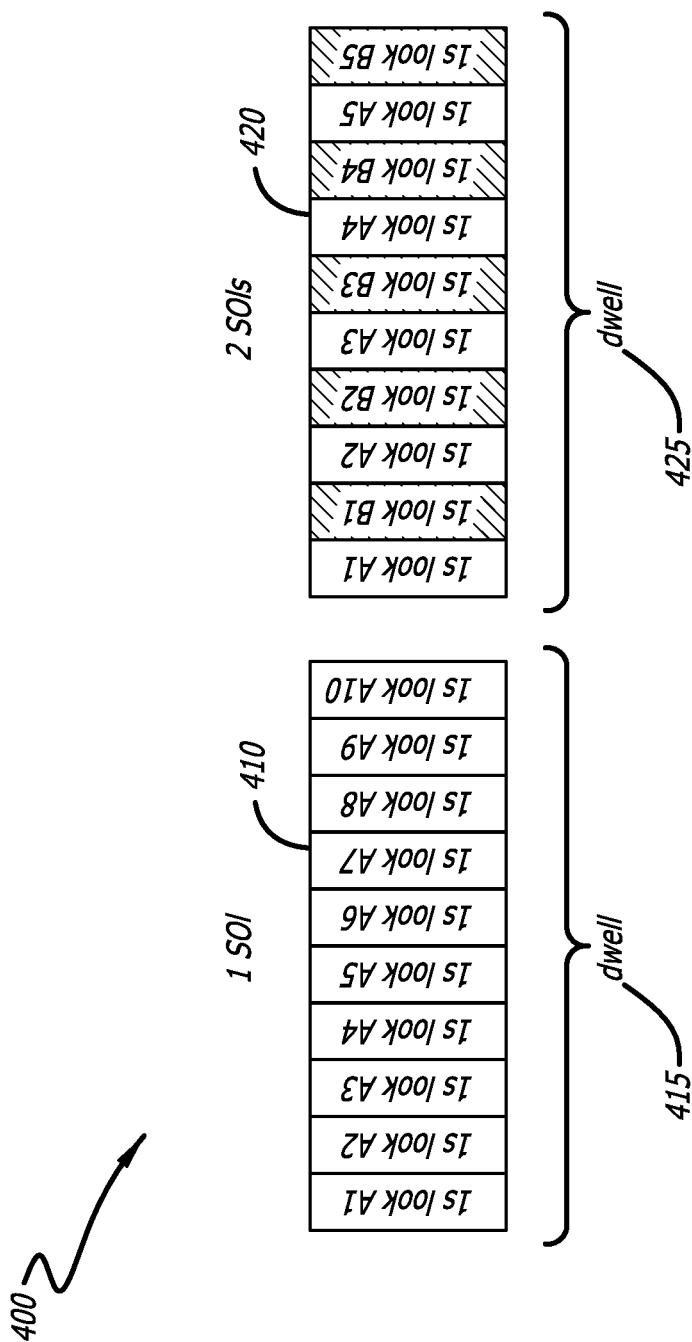
FIG. 4 is a diagram showing exemplary look schedules for monitoring one or two signals of interest (SOIs) with one receiver, in accordance with at least one embodiment of the present disclosure.

FIG. 4 is a diagram 400 showing exemplary look schedules for monitoring one signal of interest (SOI) 410 or two signals of interest (SOIs) 420 with one receiver, in accordance with at least one embodiment of the present disclosure. As shown in this figure, a dwell (e.g., 10 seconds) 415, 425 is divided into five or more "looks" of 1 second or less (as needed by CFOA). For each look, a FOA measurement is made. The possible duration of each look is bounded by the frequency measurement accuracy requirement on the upper end of the dwell 415, 425 and the number of pulses required to observe the distinct spectral line structure on the lower end of the dwell (e.g., roughly 10 pulses) 415, 425.

The required frequency accuracy is determined by operational requirements including, but not limited to, the location of the emitters of interest in the platform field of view (FOV), the platform velocity, and the platform altitude. There is a theoretical limit to frequency measurement accuracy, which is often quoted as the Cramer-Rao Lower Bound. In this case, the accuracy limit to the frequency measurement is inversely proportional to the observation time and inversely proportional to the square root of the signal-to-noise (SNR) ratio. Hence, extending the measurement observation time (i.e. look duration) necessitates the use of multiple looks.

1. Coherent FOA for Pulsed Signals

It should be noted that coherent FOA (CFOA) refers to a process (or processes) that measures the frequency of the underlying carrier signal of a RF-coherent pulse train comprising many pulses. RF coherency is a signal property, and implies that the RF pulse train is generated at baseband (including any intrapulse modulation), and is coherently translated to the operating RF for transmission, where the random phase deviation between pulses is a small fraction of a radian. This kind of signal is enabled by modern electronics and signal processing components, and is now commonly used in radars of all types, but especially in those that measure Doppler for the purpose of detection of moving targets, measuring target velocity, and imaging by synthetic aperture techniques.

Figure 5:
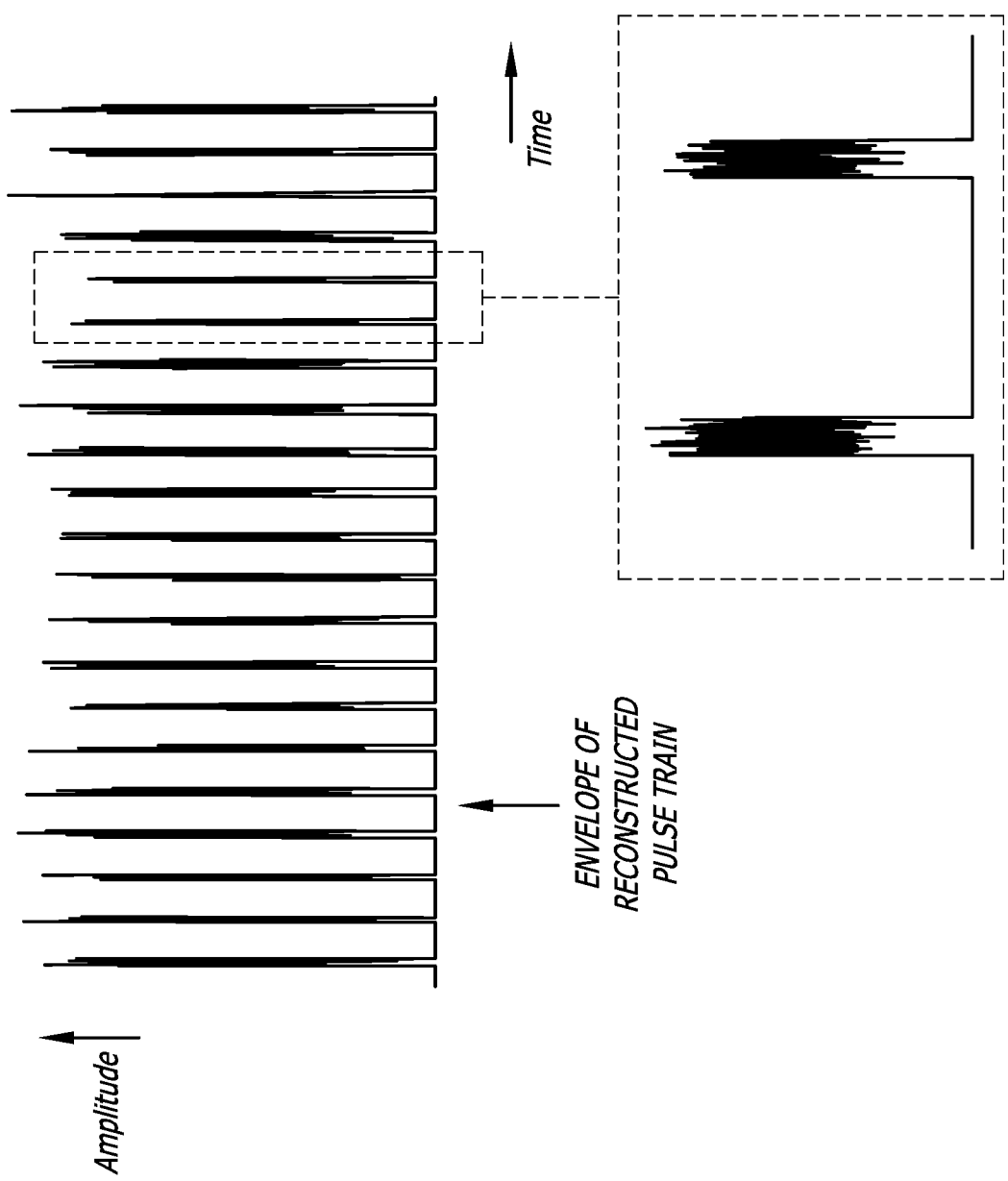
FIG. 5 is a graph showing a magnitude only of an exemplary complex pulse train look reconstructed using complex envelope samples (CES), in accordance with at least one embodiment of the present disclosure.

The implementation of CFOA requires additional considerations in the design of receiver systems. Typical Electronic Support Measures (ESM) receiving systems do not store the entire signal during a look. They may only store a description of the pulses in terms of pulse parameters including RF, pulse duration, pulse repetition frequency (PRF), etc. This description is historically referred to as the pulse descriptor word (PDW). But, to perform CFOA, additional information is needed to determine the phase advance of the underlying carrier signal over a train of pulses, assuming that the pulse train is RF coherent. Additional precision time-tagged pre-detected complex (in-phase and quadrature) envelope samples (CES) of the pulses bundled with the PDW are used for reconstruction (refer to FIG. 5) of the pulse trains of the original signal. A radar signal comprising a RF train of pulses is then completely and accurately captured in the CES and PDW data, which in the follow-on processing are used to coherently reconstruct the complex signal (refer to FIG. 5) and used to measure FOA (Doppler) history. FIG. 5 is a graph 500 showing a magnitude only of an exemplary complex pulse train look reconstructed using complex envelope samples (CES), in accordance with at least one embodiment of the present disclosure. On this graph, the x-axis denotes time, and the y-axis denotes the signal amplitude.

B. Doppler CFOA Measurement

The following methods are disclosed to determine the Doppler FOA for a look by coherently processing all of the individual pulse phase information. For each method, the complex pre-detected pulse train over each look is coherently reconstructed (refer to FIG. 5) by using the captured complex envelope samples (CES) and the associated time-tags from each pulse of the look.

1. Method 1: CFOA by Linear Regression of Phase (LRP)

Figure 6:
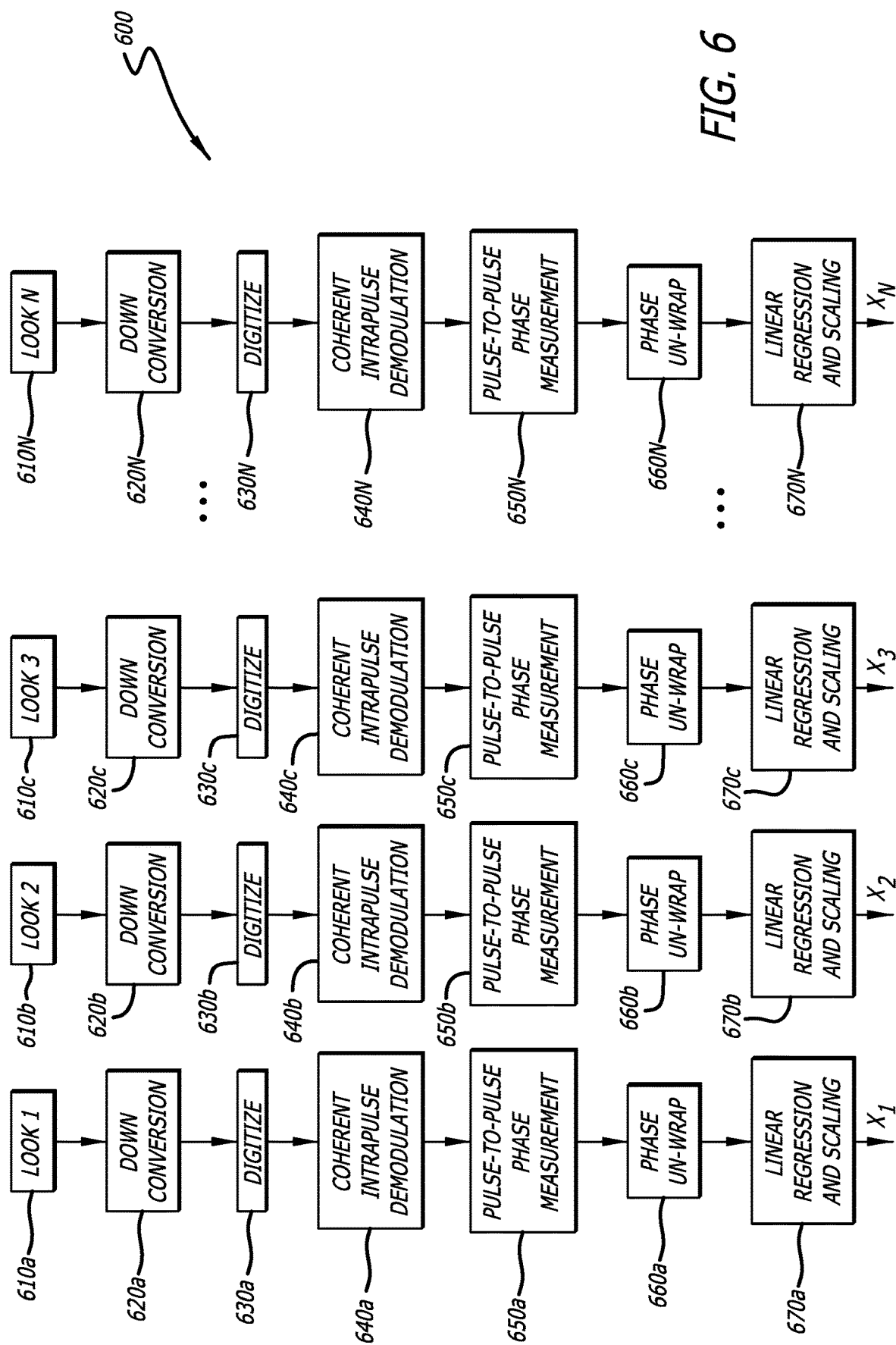
FIG. 6 is a diagram showing coherent frequency of arrival (CFOA) estimation for a pulsed emitter using linear regression of phase (LRP), in accordance with at least one embodiment of the present disclosure.

The system and process for CFOA by linear regression of phase (LRP) are shown in FIG. 6. FIG. 6 is a diagram 600 showing coherent frequency of arrival (CFOA) estimation for a pulsed emitter using linear regression of phase (LRP), in accordance with at least one embodiment of the present disclosure.

In this figure, first, the reconstructed signal for each look 610a, 610b, 610c, 610n is down-converted 620a, 620b, 620c, 620n, by a downconverter, to near zero frequency, and the type of intrapulse modulation (if any) is determined by at least one processor. The downconverted signals, which are analog, are then digitized 630a, 630b, 630c, 630n, by an analog-to-digital converter (ADC), to produce digital signals.

Then, if necessary, pulses of the signals are coherently demodulated by a demodulator 640a, 640b, 640c, 640n. In the case of linear frequency-modulated (LFM) pulses, the entire complex pre-detected pulse train signal is coherently de-chirped at the measured chirp-rate. For binary phase shift keying (BPSK) phase-modulated pulses, the entire complex pre-detected pulse train signal is squared to recover the underlying carrier signal. If the pulses are not modulated, then no demodulation is required.

Then, pulse-to-pulse phase measurements 650a, 650b, 650c, 650n are taken, by at least one processor, from the resultant signals. The modulo negative two pi ($-2\pi$) ambiguities of the phase measurements are then unwrapped 660a, 660b, 660c, 660n by at least one processor (refer to FIG. 7). From the unwrapped pulse train phase advance, linear regression (e.g., a least squares fit) and scaling 670a, 670b, 670c, 670n is then performed, by at least one processor, to determine the slope of the unwrapped pulse train phase advance over the look time.

Figure 7:
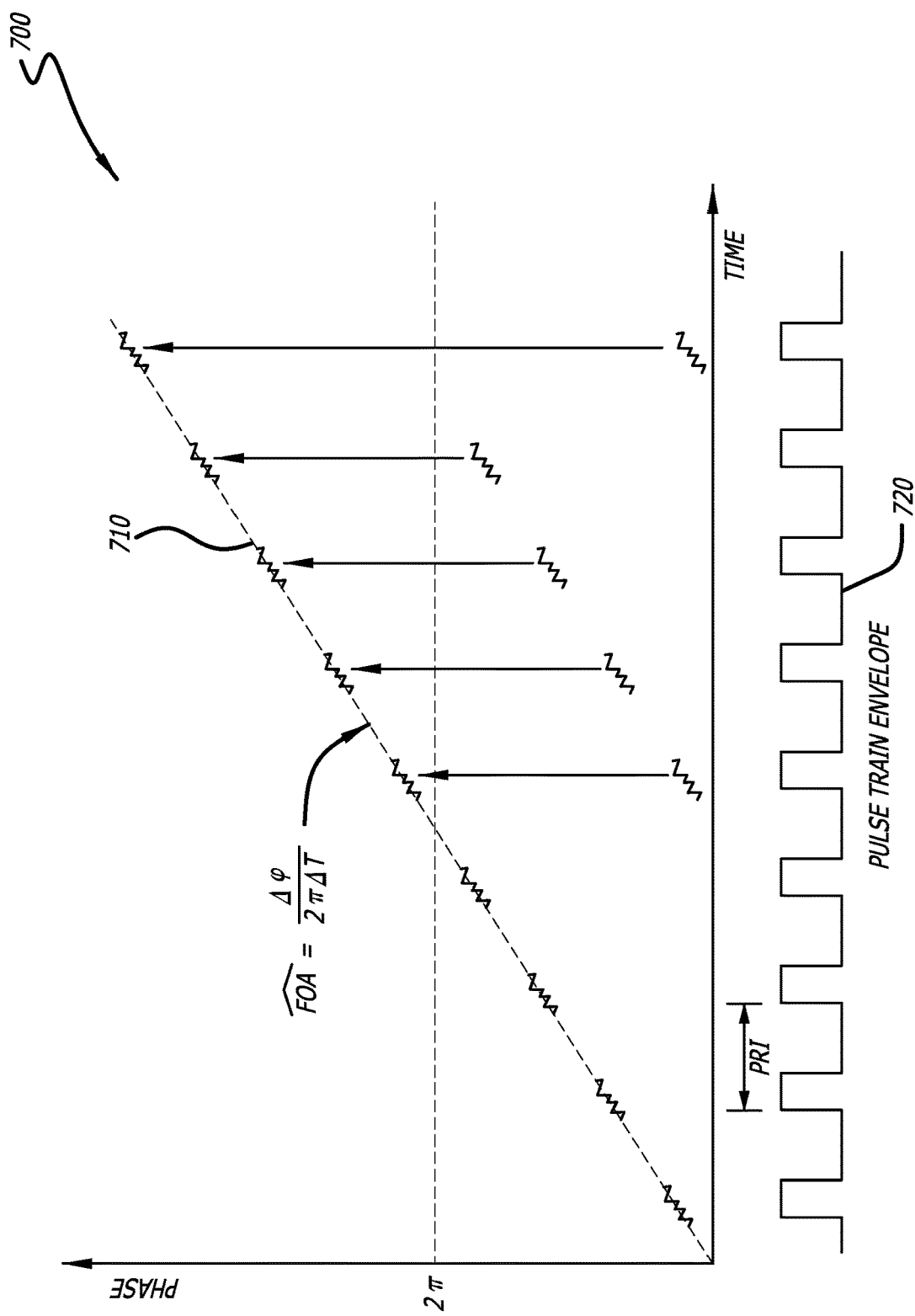
FIG. 7 is graph showing an exemplary estimated CFOA by using the pulse train phase advance, in accordance with at least one embodiment of the present disclosure.

FIG. 7 is graph 700 showing an exemplary estimated CFOA by using the pulse train phase advance, in accordance with at least one embodiment of the present disclosure. On this graph, the x-axis denotes time, and the y-axis denotes phase. Also shown is the pulse train envelope 720 (with its pulse repetition interval (PRI) denoted) associated with the graph 700.

It should be noted that the graph 700 of FIG. 7 is notional, and does not accurately account for the actual time between pulses, meaning that the inter-pulse unwrapping can be problematic for low duty-factor pulse trains. To mitigate this problem, a sophisticated use of tuned-histograms may be employed to separate out the ambiguities prior to linear regression. The CFOA measurement (i.e. $\Delta\phi/2\pi\Delta T$, where $\Delta\phi$ is the change in phase and $\Delta T$ is the change in time) is the slope 710 of the line fitted to the phase advance during the entire look duration, as is shown in FIG. 7.

2. Method 2: CFOA by Cross-Correlated Frequency Spectra (CCFS)

Figure 8:
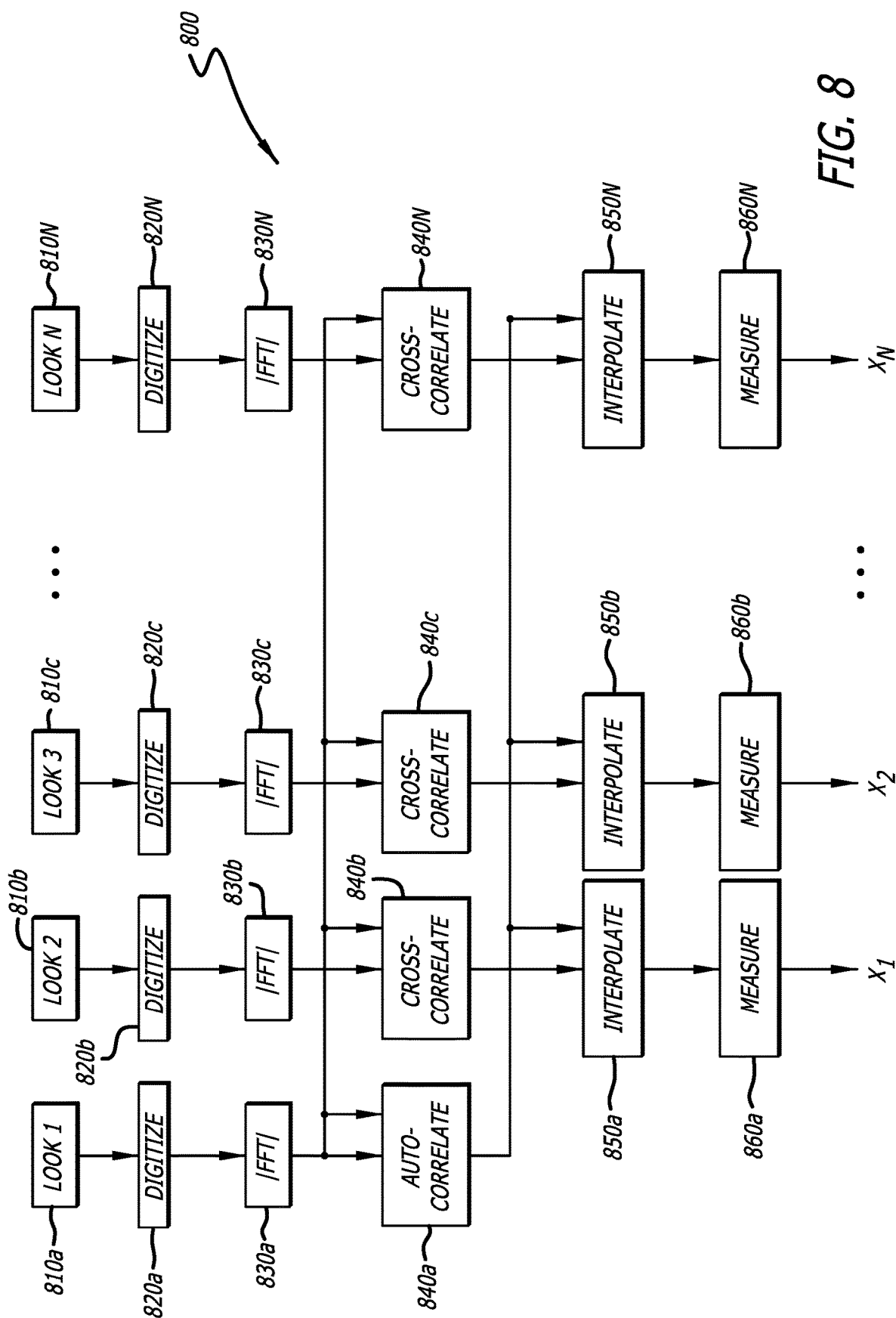
FIG. 8 is a diagram showing CFOA estimation using the cross correlation of the frequency power spectra (CCFS), in accordance with at least one embodiment of the present disclosure.

The system and process for CFOA by cross-correlated frequency spectra (CCFS) are shown in FIG. 8. FIG. 8 is a diagram 800 showing CFOA estimation using the cross correlation of the frequency power spectra (CCFS), in accordance with at least one embodiment of the present disclosure. CFOA by CCFS uses a more optimal approach, which is intrapulse-modulation agnostic and exploits the discrete spectral line structure of an RF-coherent pulse train, working independently of intrapulse modulation type.

As shown in FIG. 8, the frequency measurement process comprises first digitizing 820a, 820b, 820c, 820n, by an analog-to-digital converter (ADC), each of the looks 810a, 810b, 810c, 810n, which are analog, to produce digital signals. However, it should be noted that in other embodiments, the signal of interest (SOI) is digitized by at least one analog-to-digital converter (ADC) prior to being split into the looks 810a, 810b, 810c, 810n and, as such, for these embodiments, the looks 810a, 810b, 810c, 810n are digital signals.

Then, the process comprises computing, by at least one fast Fourier transform (FFT) processor, the power spectrum (i.e. the magnitude of the FFT) 830a, 830b, 830c, 830n for each of the digital signals separately. Each power spectrum (e.g., refer to graph 900 of FIG. 9) will exhibit a series of discrete peaks (i.e. spectral lines) with precise spacing equal to the pulse repetition frequency for a constant pulse repetition interval (PRI) pulse train, but more complex for a pulse train with staggered PRI.

Figure 9:
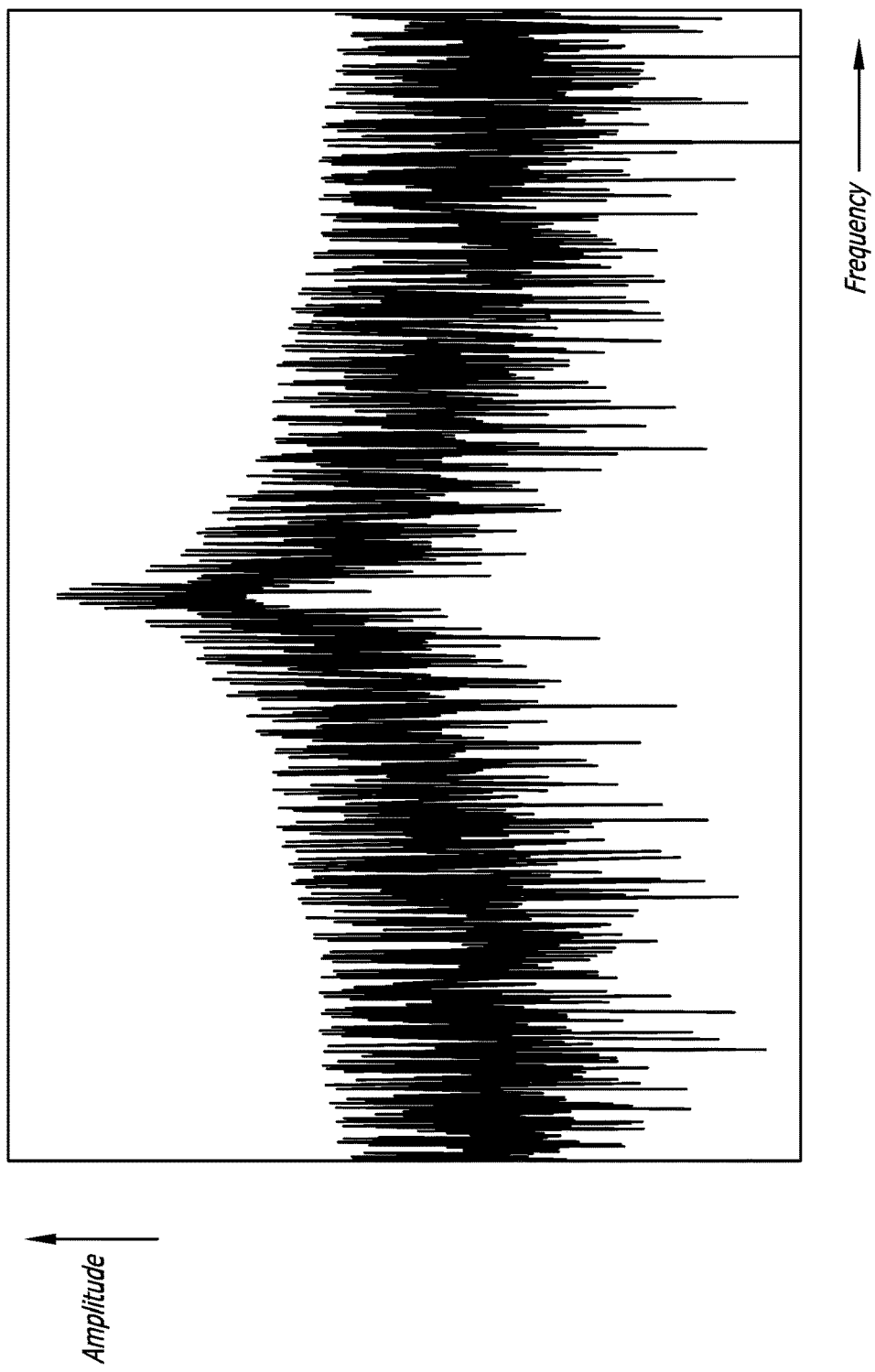
FIG. 9 is a graph showing an exemplary power spectrum of a fast Fourier transform (FFT) of a pulse train look, in accordance with at least one embodiment of the present disclosure.

FIG. 9 is a graph 900 showing an exemplary power spectrum of a fast Fourier transform (FFT) of a pulse train look, in accordance with at least one embodiment of the present disclosure. On this graph 900, the x-axis denotes frequency, and the y-axis denotes amplitude. Due to Doppler shift, the pulse train spectrum will shift, including all of the spectral lines. The frequency migration versus (vs.) time of the position of these lines between a first look (e.g., Look 1) with other looks (e.g., Look 2, Look 3, Look n) within the observation time provides the CFOA (Doppler) history.

Figure 10:
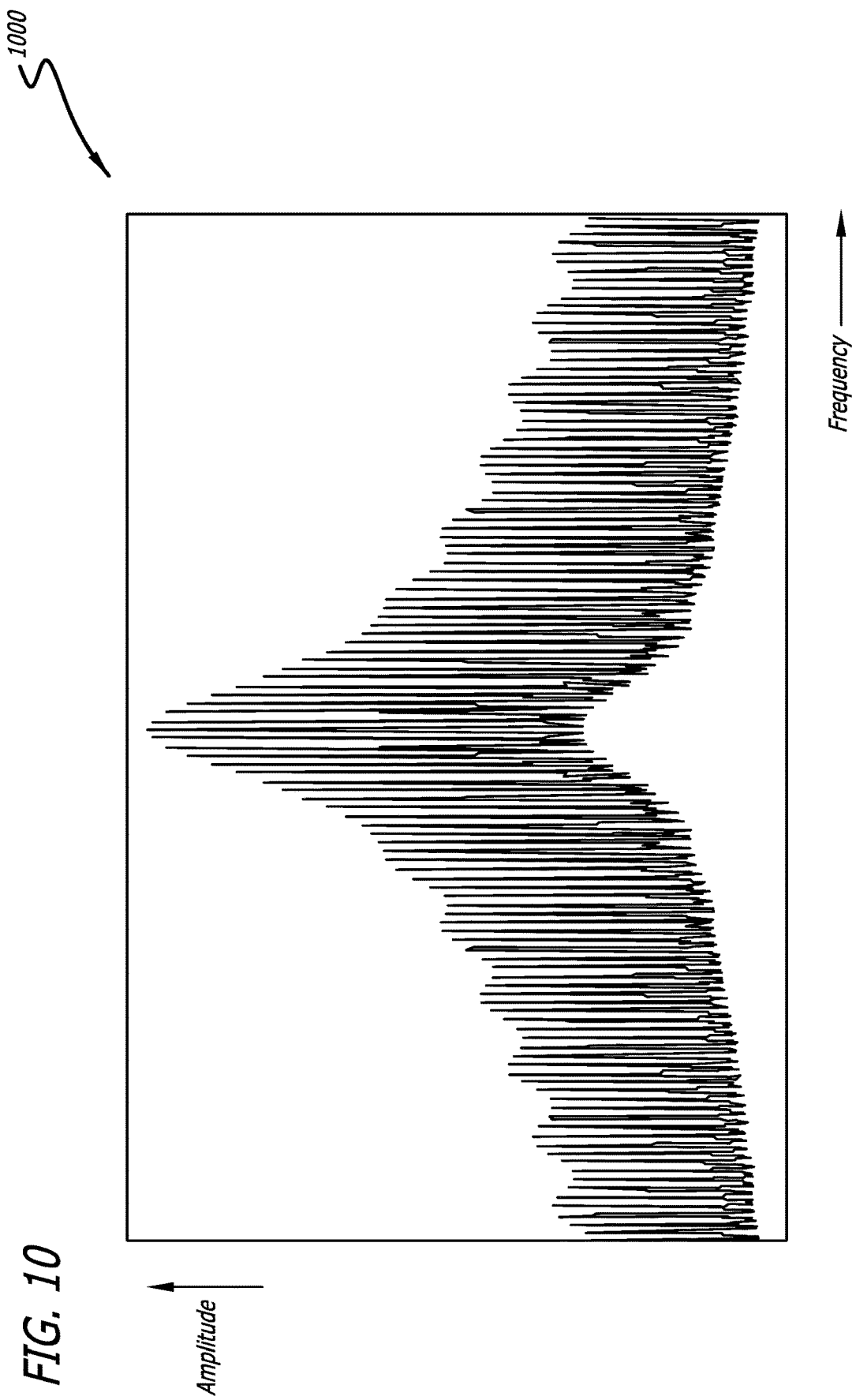
FIG. 10 is a graph showing the cross correlation of the power spectrum of FIG. 9, in accordance with at least one embodiment of the present disclosure.
Figure 11:
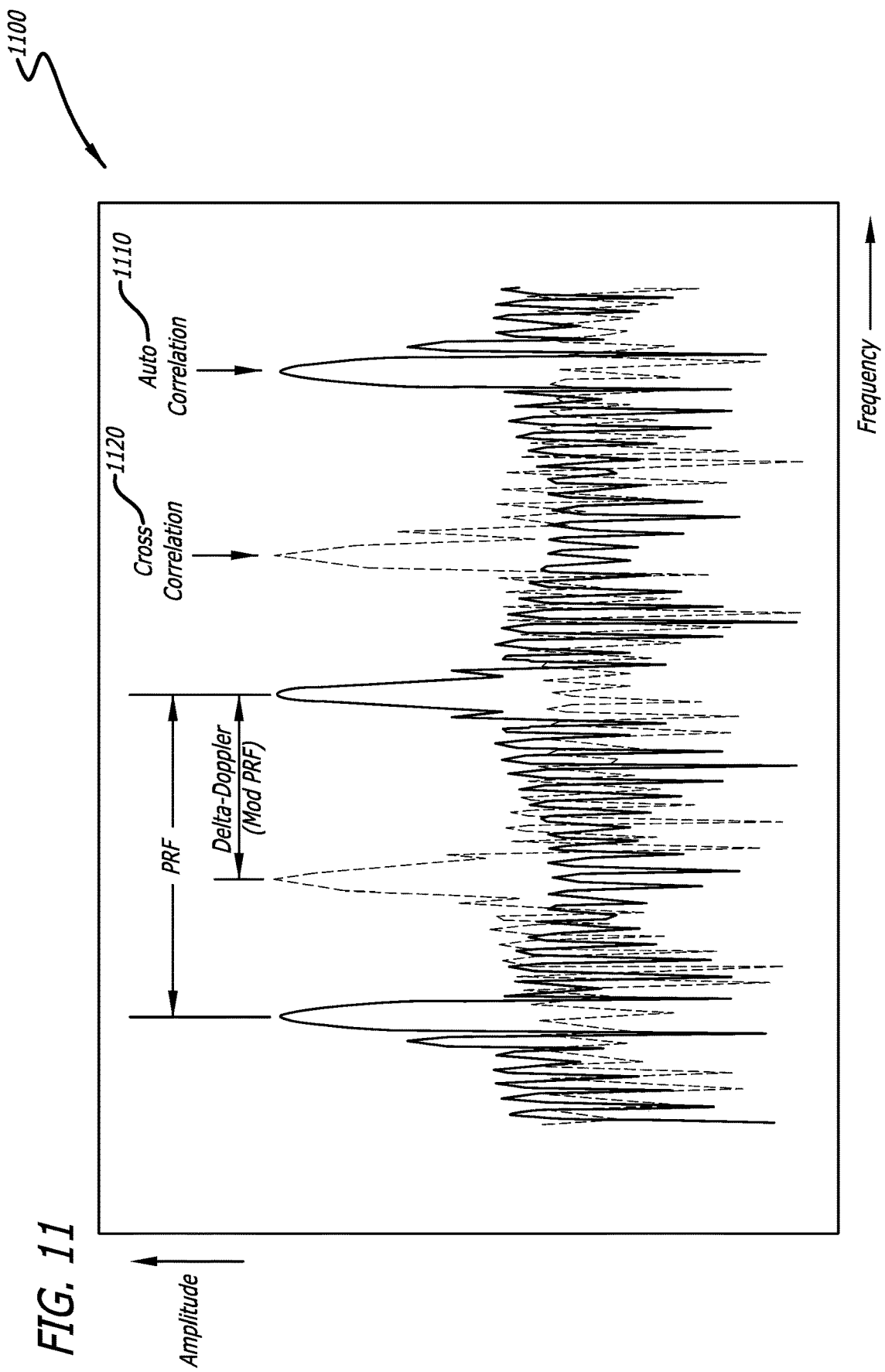
FIG. 11 is a graph showing a comparison of an auto-correlation spectrum of a first look and a cross-correlation spectrum of the first look with another look, in accordance with at least one embodiment of the present disclosure.

Referring back to FIG. 8, after the power spectrum (i.e. the magnitude of the FFT) for each look is obtained, the power spectrum for the first look (i.e. Look 1) is auto-correlated 840a, by at least one correlator, with itself to produce an auto-correlation spectrum (e.g., refer to 1110 of FIG. 11). Also, the power spectrum for the first look (i.e. Look 1) is cross-correlated 840b, 840c, 840n, by at least one correlator, with each of the power spectrums for the other looks (i.e. Look 2, Look 3, Look n) to produce a cross-correlation spectrum (e.g., refer to 1000 of FIG. 10 and 1120 of FIG. 11) for each of the other looks (i.e. Look 2, Look 3, Look n). FIG. 10 is a graph 1000 showing an exemplary cross correlation of the power spectrum of FIG. 9, in accordance with at least one embodiment of the present disclosure. On this graph 1000, the x-axis denotes frequency, and the y-axis denotes amplitude.

FIG. 11 is a graph 1100 showing a comparison of an auto-correlation spectrum 1110 of a first look (e.g., Look 1) and a cross-correlation spectrum 1120 of the first look (e.g., Look 1) with another look (e.g., Look 2, Look 3, or Look n), in accordance with at least one embodiment of the present disclosure. On this graph 1100, the x-axis denotes frequency, and the y-axis denotes amplitude. The auto-correlation spectrum 1110 (with its pulse repetition frequency (PRF) denoted) essentially serves as a reference. That is, a comparison of the auto-correlation spectrum 1110 and the cross-correlation spectrum 1120 with another look (e.g., Look 2, Look 3, or Look n) is used to determine how much the lines have migrated between the first look (e.g., Look 1) and the subsequent looks (e.g., Look 1, Look 2, Look n) to determine the Doppler history for CFOA. The auto-correlation of the first look (i.e. Look 1) (i.e. the auto-correlation spectrum 1110) and then the cross-correlation between the first look (i.e. Look 1) and subsequent looks (i.e. Look 2, Look 3, Look n) (i.e. the cross-correlation spectrum 1120) provides a means of precisely measuring the frequency advance look-to-look.

Referring back to FIG. 8, after the power spectrum of the first look (i.e. Look 1) is auto-correlated 840a with itself to produce an auto-correlation spectrum, and the power spectrum for the first look (i.e. Look 1) is cross-correlated 840b, 840c, 840n with each of the power spectrums for the other looks (i.e. Look 2, Look 3, Look n) to produce cross-correlation spectra, the spectra are then interpolated 850a, 850b, 850n to produce interpolated signals. Then, CFOA measurements 860a, 860b, 860n are made from the interpolated signals.

3. Other Methods

Other methods may be used to determine the CFOA of multiple pulses. The conventionally used complex ambiguity function (CAF) method can be used to compare looks to resolve frequency shifts after lining up the time correlation. This method is more computationally expensive than the disclosed Method 1 and Method 2 discussed above because this method requires many CAF points to find the maximum peak. There are also concerns when using this method regarding finding the local maxima instead of the total maximum. And, there are difficulties with this method with linear frequency modulation (LFM) signals creating a larger area of ambiguity. Also, this method cannot be employed for random pulse patterns. However, once processed, the output of the CFOAs from this method may be used in further processing for location determination, which is described in detail below.

C. Location Determination

This section describes the location determination using the Doppler histories obtained above. The location determination can be done by using either CFOA for signals with pulses or the more generic frequency of arrival (FOA) for continuous wave (CW) signals that do not require the extra coherent processing.

The location determination process comprises computing Doppler histories for each location, i, as observed over the same time period as the above measured FOA history, using the best available platform state vector data. The underlying principle of the technique is that, in general, each location will have a unique FOA history due to the differences in location with respect to the vehicle state vector.

1. Geo-Location

Geo-location will be performed when the emitters are not at known locations. For geo-location of the emitters, standard geo-location can be performed using the FOA data found for each look. This results in a region of error depending upon the quality of the received signal (usually represented by the signal to noise ratio (SNR)), the duration of the look, the duration of the dwell, the number of looks, and the quality of the receiver. This error is often defined in terms of a circular or elliptical region corresponding to a probability that the resulting geolocation will fall within that region. In this scheme, the metrics are usually the radius of the circle, circular error probable (CEP), or the semi-major axis of the ellipse, elliptical error probable (EEP). In one or more embodiments, an algorithm for standard geolocation using the FOA data found for each look is run on at least one processor to perform geolocation of the emitters.

2. Geo-Discrimination (GeoD)

Geo-discrimination (GeoD) will be performed when there are a finite number of emitters at known locations. For GeoD, the matching of the measured FOA history to the known possible emitter locations is easier than geolocation since only a discrimination of which known location is most likely radiating the SOI is performed. GeoD takes the FOA histories from the emitters at candidate locations on a pair-wise basis using a decision boundary threshold $T_f$ computed for each candidate pair following the Sequential Decision Test (SDT). This threshold enables a trade between the probability of an error and the probability of making no decision, an important factor in assuring control over the error rate. For M possible number of emitter locations and M(M−1)/2 pairwise combinations, the algorithm, run on at least one processor, decides the location where the measured FOA history best matches the measured FOA history. Not all M(M−1)/2 combinations need to be tested, since once a candidate emitter location fails a pair-wise test, it can be removed from any further testing. A guarantee of a minimum probability of error is when all but one are eliminated. No decision is made if any of the pair-wise matches are ambiguous.

Figure 12:
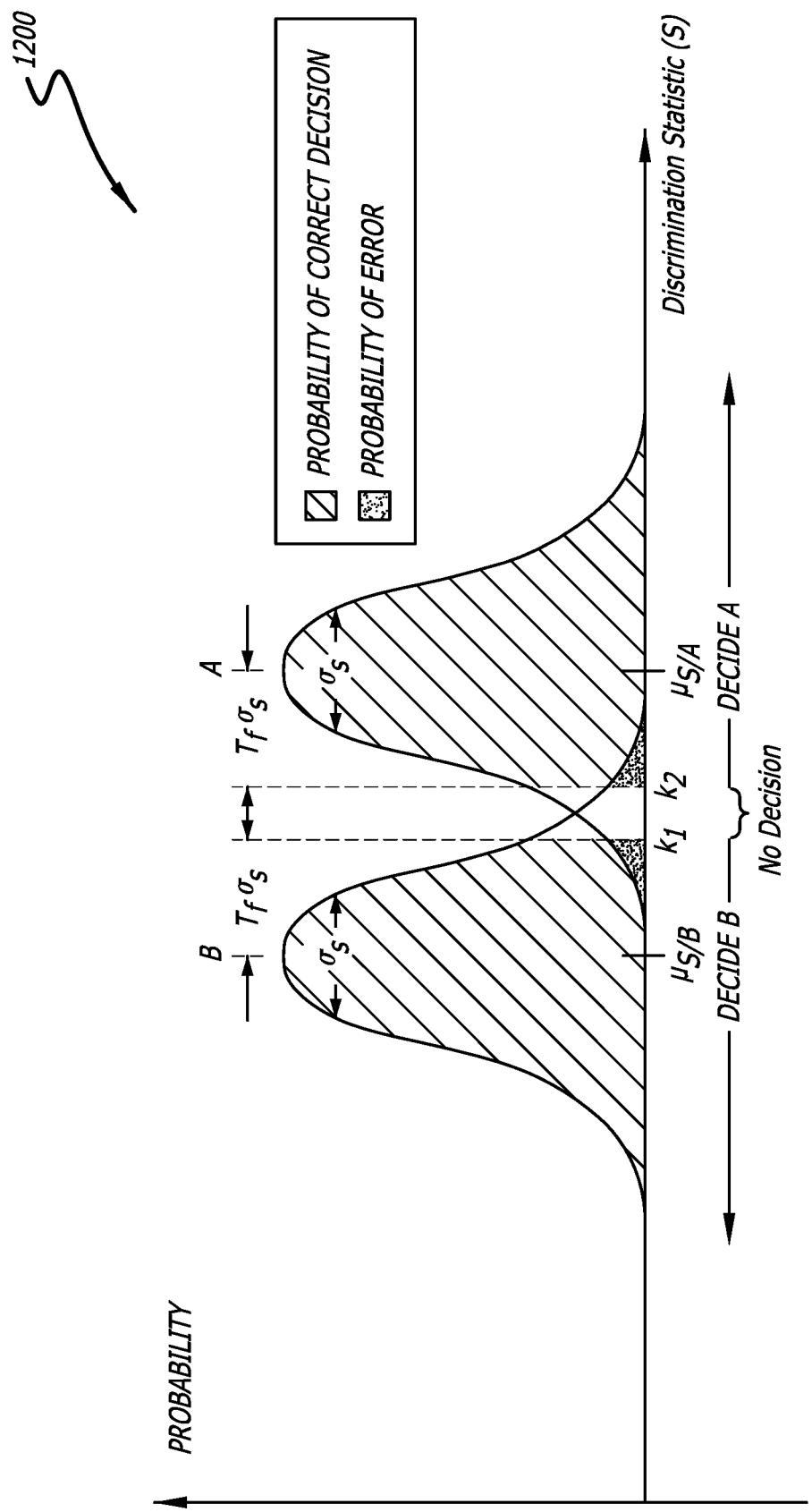
FIG. 12 is a graph showing discrimination statistic distribution and decision logic, in accordance with at least one embodiment of the present disclosure.

The decision logic for each candidate location pair is illustrated in FIG. 12, where $\sigma_s$ is the standard deviation of the decision statistic, and $\mu_{S/A}$ and $\mu_{S/B}$ are the mean values of the decision statistic given A and B, respectively. The value of the decision boundary threshold, $T_f$, is determined from the statistics of measured and computed FOA histories. FIG. 12 is a graph 1200 showing discrimination statistic distribution and decision logic, in accordance with at least one embodiment of the present disclosure. On this graph 1200, the x-axis denotes the discrimination statistic (S), and the y-axis denotes probability. A detailed discussion regarding the sequential discrimination test used to determine the discrimination statistic distribution and decision logic shown on FIG. 12 is provided in the section below. In one or more embodiments, an algorithm for GeoD that applies the FOA histories from the emitters at known locations to the sequential discrimination test is run on at least one processor to perform GeoD of the emitters.

II. Sequential Discrimination Test between Processes with Non-Stationary, but Known Means Let $X=[X_1, X_2, \ldots, X_n]$ denote independent random samples taken from one of two different Gaussian stochastic processes A or B (refer to FIG. 12). Assume both A and B have a common stationary variance $\sigma^2$, and there occurrence is mutually exclusive with $P(A)+P(B)=1$. The processes A and B are only distinguished by the means, with A having a history of varying means $\eta=[\eta_1, \eta_2, \ldots, \eta_n]$ which are known in advance, and process B having a history of varying means $v=[v_1, v_2, \ldots, v_n]$ that are also known.

The primary objective is to design a sequential test based on the random samples that will discriminate between process A or process B. Secondary objectives are (1) design the test to insure that the probability of making a discrimination error is at most $p_f$, and (2) derive and expression the probability of successful discrimination.

A sequential test is the formulation of a statistic $S=S(x_1, x_2, \ldots, x_n)$ and two thresholds $k_1 < k_2$ such that:

select $A$ if $S \geq k_2$ select $B$ if $S \leq k_1$ no decision if $k_1 < S < k_2$ (0.1)

The test is called sequential because the statistic S and thresholds $k_1$, $k_2$ can be updated as more samples become available, which provide the opportunity to make a more accurate decision.

The statistic S is based the likelihood ratio:

$$L = \frac{f(x_1, x_2, \ldots, x_n \mid A)}{f(x_1, x_2, \ldots, x_n \mid B)} \quad (0.2)$$

Where $f(x_1, x_2, \ldots, x_n \mid A)$ is the joint probability density function of X given A, $$f(x_1, x_2, \ldots, x_n \mid A) = \frac{1}{(2\pi\sigma)^{n/2}} \exp\left[-\frac{1}{2\sigma^2}\sum_{j=1}^{n}(x_j - \eta_j)^2\right]; \quad (0.3)$$

and $f(x_1, x_2, \ldots, x_n \mid B)$ is the joint probability density function of X given B, $$f(x_1, x_2, \ldots, x_n \mid B) = \frac{1}{(2\pi\sigma)^{n/2}} \exp\left[-\frac{1}{2\sigma^2}\sum_{j=1}^{n}(x_j - v_j)^2\right]. \quad (0.4)$$

To statistic S and thresholds $k_1$, $k_2$ define the test, and the best statistic, guaranteed by the Neyman-Pearson Theorem, is derived from the inequality:

$$c_1 \leq L \leq c_2, \quad (0.5)$$

where L is the likelihood ratio. Substituting (0.3) and (0.4) into (0.2) followed by some algebraic manipulation results in:

$$k_1 \leq \sum_{j=1}^{n}(x_j - v_j)^2 - \sum_{j=1}^{n}(x_j - \eta_j)^2 \leq k_2. \quad (0.6)$$

Let $$\langle x, y \rangle = \sum_{j=1}^{n} x_j y_j$$

denote the standard Euclidean inner product and Euclidean norm $\|x\|=\sqrt{\langle x,x \rangle}$, from which inequality (0.6) can be rewritten as:

$$k_1 \leq 2\langle x,\eta \rangle - 2\langle x,v \rangle + \langle v,v \rangle - \langle \eta,\eta \rangle \leq k_2. \quad (0.7)$$

From (0.7) we define the discrimination statistic S to be:

$$S = 2\langle x,\eta \rangle - 2\langle x,v \rangle + \langle v,v \rangle - \langle \eta,\eta \rangle. \quad (0.8)$$

The notation S|A means the statistic S is evaluated with samples that came from process A, and S|B means the statistic S is evaluated with samples that came from process B. Notice that S|A is a normally distributed random variable with mean:

$$\mu_{S|A} = E[2\langle x, \eta \rangle - 2\langle x, v \rangle + \langle v, v \rangle - \langle \eta, \eta \rangle] \quad (0.9)$$

$$= 2\langle \eta, \eta \rangle - 2\langle \eta, v \rangle + \langle v, v \rangle - \langle \eta, \eta \rangle$$

$$= \langle \eta - v, \eta - v \rangle$$

$$= \|\eta - v\|^2$$

and variance:

$$\sigma_{S|A}^2 = \text{var}[2\langle x, \eta - v \rangle + \langle v, v \rangle - \langle \eta, \eta \rangle] \quad (0.10)$$

$$= 4\sigma^2 \|\eta - v\|^2$$

Similarly, S|B is normally distributed with mean:

$$\mu_{S|B} = -\|\eta - v\|^2, \quad (0.11)$$

and variance:

$$\sigma_{S|B}^2 = 4\sigma^2 \|\eta - v\|^2 \quad (0.12)$$

From which it is observed that:

$$\sigma_S^2 = \sigma_{S|A}^2 = \sigma_{S|B}^2 = 4\sigma^2 \|\eta - v\|^2. \quad (0.13)$$

Using the decision logic (0.1), a discrimination error is made only if:

$S \geq k_2$ when $B$ true $S \leq k_1$ when $A$ true (0.14)

Thus, in order to set the probability of making an error to $p_f$ we must choose $k_1$ and $k_2$ so that:

$$p_f = P(S \geq k_2 \mid B)P(B) + P(S \leq k_1 \mid A)P(A) \quad (0.15)$$

Also, a reasonable choice here is to set $k_1$ and $k_2$ so that both probabilities in (0.15) are equal, that is:

$$P(S \geq k_2 \mid B) = P(S \leq k_1 \mid A). \quad (0.16)$$

Thus, $$p_f = P(S \geq k_2 \mid B) = P(S \leq k_1 \mid A) \quad (0.17)$$

Evaluating the former results in:

$$p_f = P(S \geq k_2 \mid B) = P\left(\frac{S - \mu_{S|B}}{\sigma_S} \geq \frac{k_2 - \mu_{S|B}}{\sigma_S}\right), \quad (0.18)$$

and the latter:

$$p_f = P(S \leq k_1 \mid A) = P\left(\frac{S - \mu_{S|A}}{\sigma_S} \leq \frac{k_1 - \mu_{S|A}}{\sigma_S}\right) \quad (0.19)$$

Where, in both cases, the quantities:

$$\frac{S - \mu_{S|B}}{\sigma_S} \text{ and } \frac{S - \mu_{S|A}}{\sigma_S} \quad (0.20)$$

are standard normal random variables. Let $T_f$ be defined by using the standard normal probability distribution, such that:

$$p_f = \frac{1}{\sqrt{2\pi}} \int_{-\infty}^{T_f} \exp\left[-\frac{x^2}{2}\right] dx. \quad (0.21)$$

The relationship between $p_f$ and $T_f$ is denoted by either $p_f = \mathcal{N}^{-1}(T_f)$ or $T_f = \mathcal{N}^{-1}(p_f)$. Using this notation, it follows that:

$$\frac{k_2 - \mu_{S|B}}{\sigma_S} = T_f \text{ and } \frac{k_1 - \mu_{S|A}}{\sigma_S} = -T_f. \quad (0.22)$$

Equivalently, substituting (0.9), (0.10), (0.11) and (0.12) into (0.22) yields:

$$k_2 = 2\sigma\|\eta - v\|T_f - \|\eta - v\|^2$$

$$k_1 = -2\sigma\|\eta - v\|T_f + \|\eta - v\|^2 \quad (0.23)$$

From equations (0.23) the probability of discrimination can be calculated:

$$P_{Discrim} = P(S \geq k_2 \mid A)P(A) + P(S \leq k_1 \mid B)P(B). \quad (0.24)$$

First, $$P(S \geq k_2 \mid A) = P\left(\frac{S - \mu_{S|A}}{\sigma_S} \geq \frac{k_2 - \mu_{S|A}}{\sigma_S}\right) \quad (0.25)$$

$$= 1 - N\left[\frac{k_2 - \mu_{S|A}}{\sigma_S}\right]$$

$$= 1 - N\left[T_f - \frac{\|\eta - v\|}{\sigma}\right]$$

$$= N\left[\frac{\|\eta - v\|}{\sigma} - T_f\right]$$

Similarly, $$P(S \leq k_1 \mid B) = P\left(\frac{S - \mu_{S|B}}{\sigma_S} \geq \frac{k_1 - \mu_{S|B}}{\sigma_S}\right) \quad (0.26)$$

$$= N\left[\frac{k_1 - \mu_{S|B}}{\sigma_S}\right]$$

-continued $$= N\left[\frac{\|\eta - v\|}{\sigma} - T_f\right]$$

Therefore, $$P_{Discrim} = N\left[\frac{\|\eta - v\|}{\sigma} - T_f\right] \quad (0.27)$$

Equation (0.27) is the desired equation describing the probability of discrimination based on knowledge of the mean histories $\eta$ and $v$, the variance of the random samples $\sigma^2$ and the probability of error $p_f = \mathcal{N}^{-1}(T_f)$.

III. GeoD Error Sources

There are several important sources of GeoD error that are considered as part of the system design and evaluation. As with geolocation, in general, GeoD is critically dependent on FOA errors and collection geometry. In fact, the effect of measurement error on FOA GeoD is virtually identical to that of FOA geolocation. The primary sources of FOA error are random frequency measurement error (which is primarily due to thermal noise), RF instability of the SOI, and the master oscillator of the collection platform.

Random frequency measurement error is critically dependent on the measurement method. But by careful design of the measurement algorithm, the measurement error can approach the Cramer-Rao Lower Bound (CRLB), which is inversely proportional to integration time and the square root of the SNR.

The RF instability of the SOI is uncontrolled and systematic. Although the signals of interest are coherent, the actual RF stability of the signals is essentially unknown.

The master oscillator of the collection platform is systematic and controllable, which is determined by the frequency stability of the reference oscillator of the collection system. Commercially available ovenized crystal oscillators marketed in the United States typically have frequency stabilities of about 0.05 Hertz/Gigahertz (Hz/GHz) for averaging time up to 100 seconds, which is more than adequate for the FOA GeoD function.

Another possible source of error for SOIs with RFs below about 200 megahertz (MHz) is the ionosphere. In the ionosphere, the propagation path is refracted, and the Doppler shift deviates from the line of sight (LOS) behavior and is difficult to predict. This is particularly the case at low grazing angles at ionosphere highs. For certain times of the day, the season, and phase of the solar cycle, the FOA measurements may need to be restricted to the higher grazing angles for SOIs with RFs below about 200 MHz.

Although particular embodiments have been shown and described, it should be understood that the above discussion is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims.

Where methods described above indicate certain events occurring in certain order, those of ordinary skill in the art having the benefit of this disclosure would recognize that the ordering may be modified and that such modifications are in accordance with the variations of the present disclosure. Additionally, parts of methods may be performed concurrently in a parallel process when possible, as well as performed sequentially. In addition, more parts or less part of the methods may be performed.

Accordingly, embodiments are intended to exemplify alternatives, modifications, and equivalents that may fall within the scope of the claims.

Although certain illustrative embodiments and methods have been disclosed herein, it can be apparent from the foregoing disclosure to those skilled in the art that variations and modifications of such embodiments and methods can be made without departing from the true spirit and scope of the art disclosed. Many other examples of the art disclosed exist, each differing from others in matters of detail only. Accordingly, it is intended that the art disclosed shall be limited only to the extent required by the appended claims and the rules and principles of applicable law.

We claim:

1. A method for location determination, the method comprising:
   receiving, by an antenna mounted on a moving platform, a plurality of signals transmitted from a plurality of emitters;
   identifying a signal of interest (SOI) from the signals;
   splitting the SOI into a plurality of look segments;
   determining frequency of arrival (FOA) measurements from the look segments by performing linear regression and scaling to determine a slope of each of unwrapped pulse train phase advances obtained from pulse-to-phase measurements from the look segments; and
   determining a location of the emitter, from the plurality of emitters, that transmitted the SOI by using the FOA measurements.

2. The method of claim 1, wherein the method further comprises:
   downconverting each of the look segments to generate downconverted look segments;
   coherently demodulating each of the downconverted look segments to generate demodulated look segments; and
   obtaining the pulse-to-phase measurements from each of the demodulated look segments.

3. The method of claim 1, wherein when the emitters are at known locations, the determining of the location of the emitter that transmitted the SOI by using the FOA measurements comprises: discriminating the location of the emitter that transmitted the SOI from the known locations by utilizing a likelihood statistical discrimination process that analyzes the FOA measurements to determine which of the known locations is most likely radiating the SOI.

4. The method of claim 1, wherein when the emitters are at unknown locations, the determining of the location of the emitter that transmitted the SOI by using the FOA measurements comprises: performing geo-location by using the FOA measurements.

5. The method of claim 1, wherein the location of the emitter that transmitted the SOI is a location known to have an emitter of a same type as the emitter that transmitted the SOI.

6. The method of claim 1, wherein the signals are radio frequency (RF) signals.

7. The method of claim 1, wherein the signals are at least one of coherent pulse train signals or continuous wave (CW) signals.

8. The method of claim 1, wherein the moving platform is a vehicle.

9. The method of claim 8, wherein the vehicle is an airborne vehicle, a terrestrial vehicle, or a marine vehicle.

10. The method of claim 1, wherein each of the emitters is a known type of emitter.

11. The method of claim 1, wherein the antenna is a reflector antenna, a multifeed antenna, or a phased array antenna.

12. The method of claim 1, wherein the FOA measurements are coherent frequency of arrival (CFOA) measurements.

13. A system for location determination, the system comprising:
    an antenna, mounted on a moving platform, to receive a plurality of signals transmitted from a plurality of emitters; and
    processing circuitry configured to identify a signal of interest (SOI) from the signals, to split the SOI into a plurality of look segments, to determine frequency of arrival (FOA) measurements from the look segments by performing linear regression and scaling to determine a slope of each of unwrapped pulse train phase advances obtained from pulse-to-phase measurements from the look segments, and to determine a location of the emitter, from the plurality of emitters, that transmitted the SOI by using the FOA measurements.

14. The system of claim 13, wherein the processing circuitry is further configured: to downconvert each of the look segments to generate downconverted look segments, to coherently demodulate each of the downconverted look segments to generate demodulated look segments, and to obtain the pulse-to-phase measurements from each of the demodulated look segments.

15. The system of claim 13, wherein when the emitters are at known locations, the processing circuitry is configured to determine the location of the emitter that transmitted the SOI by using the FOA measurements by discriminating the location of the emitter that transmitted the SOI from the known locations by utilizing a likelihood statistical discrimination process that analyzes the FOA measurements to determine which of the known locations is most likely radiating the SOI.

16. The system of claim 13, wherein when the emitters are at unknown locations, the processing circuitry is configured to determine the location of the emitter that transmitted the SOI by using the FOA measurements by performing geo-location by using the FOA measurements.

17. The system of claim 13, wherein the moving platform is a vehicle.

18. The system of claim 17, wherein the processing circuitry is located on the vehicle or at a different location other than the vehicle.

19. The system of claim 13, wherein the processing circuitry comprises at least one of a processor, a downconverter, a filter, a demodulator, a fast Fourier transform (FFT) processor, an interpolator, or an analog-to-digital converter (ADC).

20. The system of claim 13, wherein the signals are at least one of coherent pulse train signals or continuous wave (CW) signals.

21. A method for location determination, the method comprising:
    receiving, by an antenna mounted on a moving platform, a plurality of signals transmitted from a plurality of emitters;
    identifying a signal of interest (SOI) from the signals;
    splitting the SOI into a plurality of look segments;
    determining frequency of arrival (FOA) measurements from the look segments by:
       autocorrelating a power spectrum of one of the look segments to generate an auto-correlation spectrum, cross-correlating the power spectrum of the one of the look segments with power spectrums of other of the look segments to generate cross-correlation spectrums, and interpolating a peak of the auto-correlation spectrum with a peak of each of the cross-correlation spectrums to generate interpolated signals, which provide the FOA measurements; and determining a location of the emitter, from the plurality of emitters, that transmitted the SOI by using the FOA measurements.

\* \* \* \* \*